United States Patent Office.

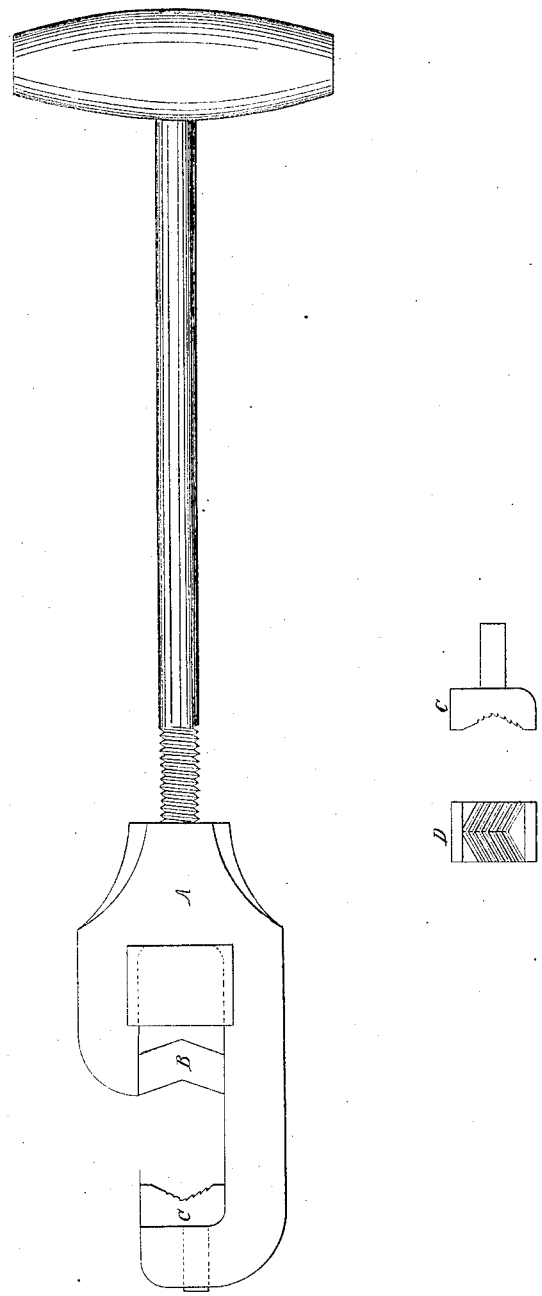

JOHN V. JEPSON, OF BROOKLYN, NEW YORK.

Letters Patent No. 63,524, dated April 2, 1867.

IMPROVEMENT IN PIPE CUTTER.

The Schedule referred to in these Letters Patent and making part of the same.

TO ALL WHOM IT MAY CONCERN:

Be it known that I, JOHN V. JEPSON, of Brooklyn, in the county of Kings, and State of New York, have invented a certain new and useful Improvement in Pipe or Tube Cutters; and I do hereby declare the following to be a full, clear, and exact description of the same, reference being had to the annexed drawing, making part of this specification, and in which is shown the side elevation of a tube or pipe cutter with my improvement applied thereto.

The object of my improvement is to cut or scrape the scale and bur off of the pipe or tube at the same time the cutter separates it.

In the drawing, A represents the head of the cutter, and B the cutter, which are the same as that for which a patent was allowed to me on the 27th of June, 1866. Indeed the tool for which a patent was then allowed is the same in every respect excepting only the scraper C, which in this case takes the place of the lower cutter in the other tool. A front elevation of this scraper is shown by D, and a side elevation by C, which also shows the stem, which passes through the lower jaw of the wrench, and which holds the scraper in its place. In working the tool the pipe or tube is placed between the scraper C and cutter B, which last-mentioned device is pressed forward on the tube and revolved or vibrated about its surface, and as the cutter makes its way in the pipe the scraper cleans off the scale and bur on both sides of the cut; the face of the scraper being made wide enough, as at D, to clean both sides of the cut as described.

Having now described the nature of my invention, I claim, and desire to secure by Letters Patent—

The use of a scraper, C, in combination with a cutter, B, when the two are arranged in a tool, to cut and scrape a pipe or tube as set forth.

JOHN V. JEPSON.

Witnesses:
AMOS BROADNAX,
PETER D. KENNY.